April 20, 1926.
G. J. THOMAS
1,581,302
BRAKE CONTROL
Filed June 15, 1925    2 Sheets-Sheet 1
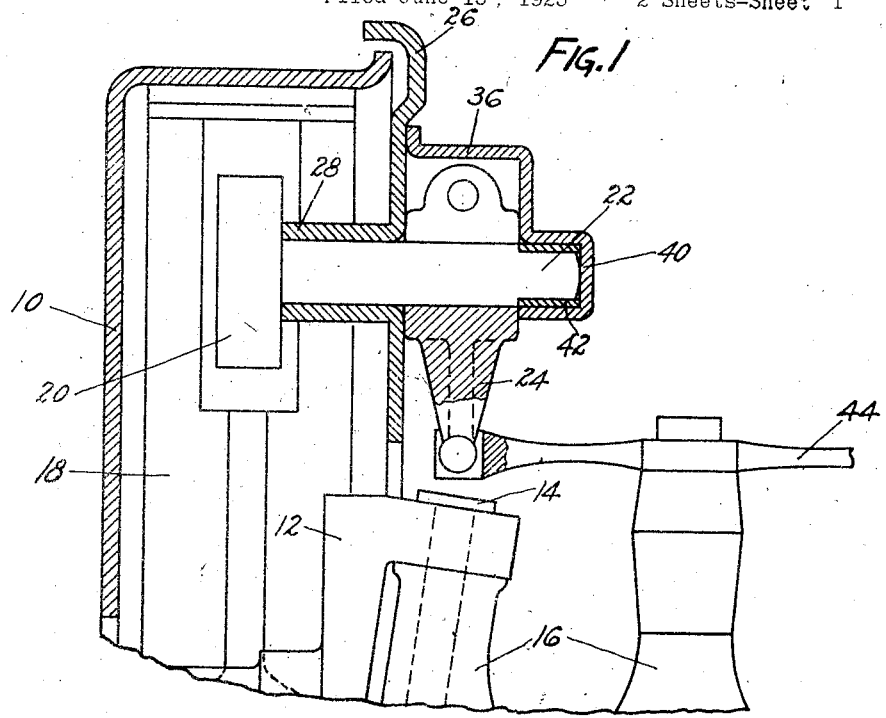
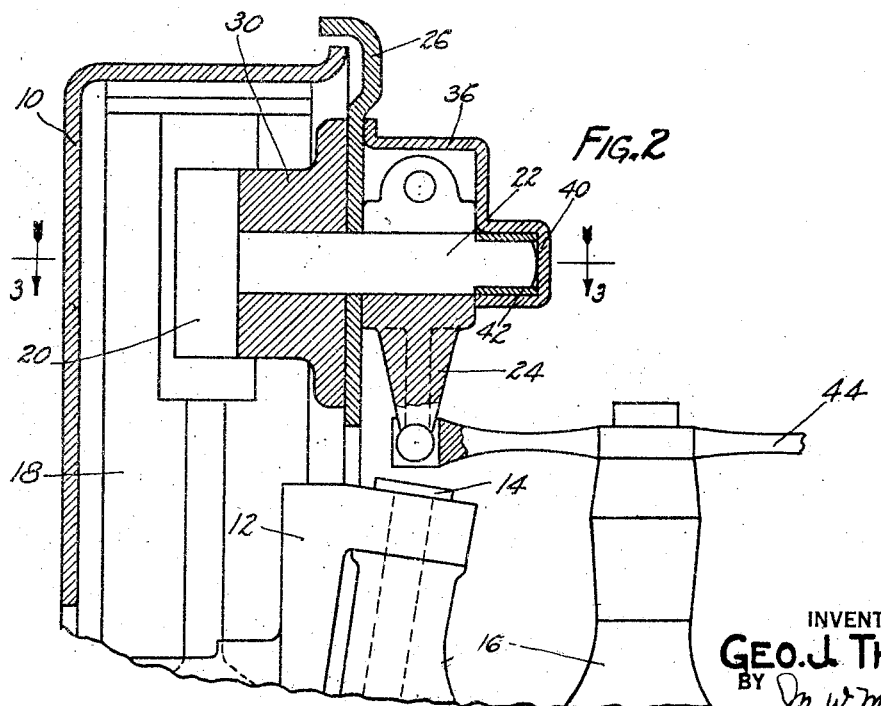
INVENTOR
GEO. J. THOMAS
BY
M. W. McConkey
ATTORNEY April 20, 1926.
G. J. THOMAS
BRAKE CONTROL
Filed June 15, 1925    2 Sheets-Sheet 2
1,581,302
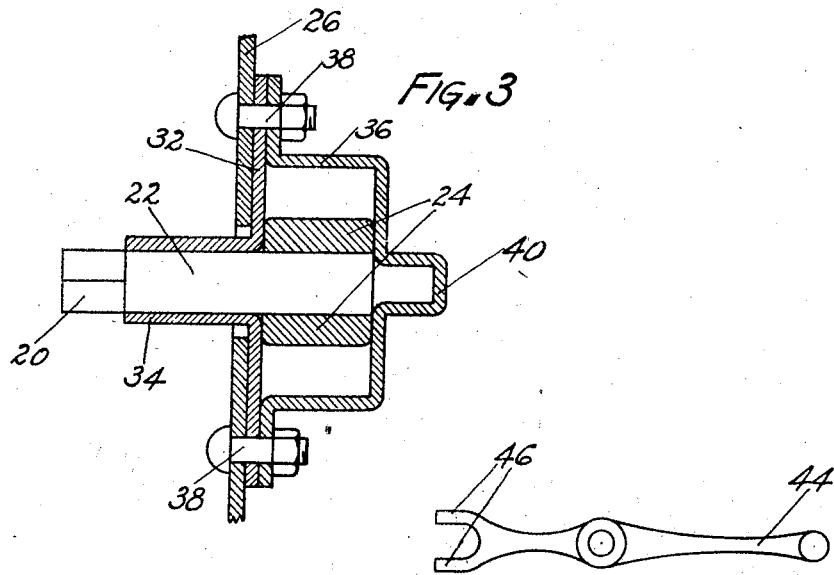
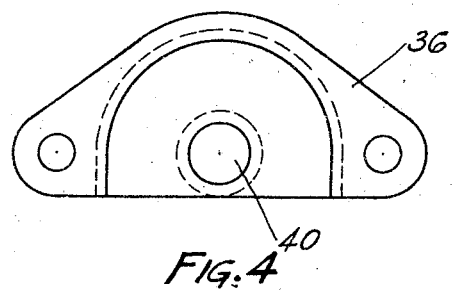
INVENTOR
GEO. J. THOMAS
BY *M. W. McConkey*
ATTORNEY Patented Apr. 20, 1926.

1,581,302

UNITED STATES PATENT OFFICE.

GEORGE J. THOMAS, OF SOUTH BEND, INDIANA, ASSIGNOR TO BENDIX BRAKE COMPANY, OF CHICAGO, ILLINOIS, A CORPORATION OF ILLINOIS.

BRAKE CONTROL.

Application filed June 15, 1925. Serial No. 37,117.

*To all whom it may concern:*

Be it known that I, GEORGE J. THOMAS, a citizen of the United States, residing in South Bend, in the county of St. Joseph and State of Indiana, have invented certain new and useful Improvements in Brake Controls, of which the following is a specification.

This invention relates to brakes, and is illustrated as embodied in an automobile front wheel brake.

One feature of the invention relates to a novel outboard bearing for the brake shaft for the cam or its equivalent, preferably in the form of an inexpensive pressed-metal stamping. While of use in other connections, this bearing is especially useful in a front brake of the illustrated type, in which the pressure on the shaft comes at different angles as the wheel is swivelled more or less from its straight-ahead position.

Other features relate to a novel forked lever forming part of the brake control, and to other new combinations of parts and desirable particular constructions which will be apparent from the following description of several illustrative embodiments shown in the accompanying drawings, in which:

Figure 1 is a vertical section through part of one front brake and associated parts;

Figure 2 is a similar view of a second modification;

Figure 3 is a section corresponding to a section on the line 3—3 of Figure 2, but showing a third modification;

Figure 4 is an inside elevation of the stamping forming the bearing; and

Figure 5 is a plan view, on a smaller scale, of the operating lever.

The various illustrated arrangements all include a drum 10 on a wheel rotatably mounted on a knuckle 12 swivelled by a king pin 14 on an axle 16. Shoes or other friction means 18 are operated by a cam or the like 20 on a shaft 22 having an operating arm 24 on the opposite side of the backing plate 26.

In the arrangement of Figure 1, the backing plate 26 is drawn out to form a tubular sleeve 28 serving as a bearing for shaft 22. In Figure 2 a separate member 30 is attached to the backing plate 26 to serve as a bearing. In Figure 3 a separate stamping 32 has a part 34 drawn out to serve as a bearing for the shaft 22.

The outboard bearing for the end of the shaft may be in the form of a stamping 36 attached to the backing plate 26 by bolts 38. This stamping has a cup-shaped part enclosing the end of the shaft, in the center of which is drawn a socket 40 serving as a bearing for the reduced end of shaft 22. A bushing 42 may be placed in the socket if desired. The bottom side of the stamping is open to give clearance for arm 24.

When used on a front brake, I prefer to operate arm 24 by a lever 44, which may be fulcrumed on the axle, and which has a cable or link of the brake-operating mechanism connected to its inner end. This lever is forked at 46 to embrace the end of arm 24. When lever 44 is operated to apply the brake, the end of arm 24 is swung from an idle position spaced from the swivelling axis (i. e., the axis of king pin 14) to an active position substantially in that axis. If the outer brake is to be released on a turn, no balance lever or other equalizer is included in the operating connections for the two front brakes, and the end of arm 24 in active position is spaced slightly from the swivelling axis on the side toward the wheel.

While several illustrative embodiments have been described in detail, it is not my intention to limit the scope of the invention to those particular embodiments, or otherwise than by the terms of the appended claims. The general arrangement of the levers illustrated except as defined by the claims is the invention of Adiel Y. Dodge and Vincent Bendix, and is covered by their applications.

I claim:

1. A vehicle having a wheel swivelled at the end of an axle, together with a brake comprising, in combination with said parts, a drum rotating with the wheel, a stationary support, friction means between the drum and support, a cam for operating the friction means, a cam-shaft journalled in the support, an arm on the side of the support opposite the drum having a part movable from an idle position spaced from the swivelling axis to an active position substantially in that axis, means engaging said part of the arm to move it to active position, and an outboard bearing secured to the support and receiving the end of the shaft.

2. A vehicle having a wheel swivelled at the end of an axle, together with a brake comprising, in combination with said parts, a drum rotating with the wheel, a stationary support, a friction means between the drum and support, a cam for operating the friction means, a cam-shaft journalled in the support, an arm on the side of the support opposite the drum having a part movable from an idle position spaced from the swivelling axis to an active position substantially in that axis, a pivoted lever having a part engaging said part of the arm to move it to active position, and an outboard bearing secured to the support and receiving the end of the shaft.

3. A brake comprising, in combination, a drum, a stationary support at the open side of the drum, friction means engagable with the drum, an operating device for said means with a shaft having a bearing in the support, an operating arm on the shaft on the opposite side of the support from the drum, and an outboard bearing for the end of the shaft carried by the support, the operating arm being between the outboard bearing and the support.

4. A brake comprising, in combination, a drum, a stationary support at the open side of the drum, friction means between the support and drum engagable with the drum, an operating device for said means with a shaft having a bearing in the support, said device being between the support and drum, an operating arm on the shaft on the opposite side of the support from said device, and an outboard bearing for the end of the shaft carried by the support, the operating arm being between the outboard bearing and the support.

5. A brake comprising, in combination, a drum, a stationary support at the open side of the drum, friction means engagable with the drum and including an operating device and a shaft therefor having a bearing in the support, a member secured to the support and extending across the end of the shaft and having a socket receiving and supporting the end of the shaft, and an operating arm on the shaft between the support and said member.

6. A brake comprising, in combination, a drum, a stationary support at the open side of the drum, a friction means engagable with the drum and including an operating device and a shaft therefor having a bearing in the support, a stamping open at one side secured to the support and extending across the end of the shaft and having a socket receiving and supporting the end of the shaft, and an operating arm on the shaft between the support and said member and projecting through said open side.

7. A backing plate for a brake having an opening for a brake-operating shaft, and having an integrally-drawn tubular sleeve about the opening forming a bearing for the shaft.

8. A stamping for an outboard bearing for a brake-operating shaft, having ears to be secured to a backing plate, and a cup-shaped part to enclose the end of the shaft and formed at a central portion with a socket to receive and support the end of the shaft, and open at one side for an operating arm on the shaft.

9. A vehicle having a wheel swivelled at the end of an axle, together with a brake comprising, in combination therewith, retarding means operating on the wheel, operating connections therefor including an arm having a rounded end movable from an idle position spaced from the swivelling axis of the wheel to an active position substantially in that axis, and a pivoted lever having a forked end receiving the rounded end of said arm, the lever and arm being movable in planes substantially at right angles to each other.

10. A vehicle having a wheel swivelled at the end of an axle, together with a brake comprising, in combination therewith, retarding means operating on the wheel, operating connections therefor including a lever having its end movable from an idle position spaced from the swivelling axis of the wheel to an active position substantially in that axis, and a pivoted lever having its end engaging the end of said lever, the end of one lever being forked and embracing the end of the other lever, the two levers being movable in planes substantially at right angles to each other.

In testimony whereof I have hereunto signed my name.

GEORGE J. THOMAS.